United States Patent
Iwamoto

(10) Patent No.: US 8,413,474 B2
(45) Date of Patent: Apr. 9, 2013

(54) MONITORING APPARATUS AND MONITORING METHOD OF SEAMLESS PIPE OR TUBE PRODUCTION CONDITIONS AND MANUFACTURING FACILITIES OF SEAMLESS PIPE OR TUBE

(75) Inventor: Hiroyuki Iwamoto, Sanda (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 12/310,818

(22) PCT Filed: Aug. 6, 2007

(86) PCT No.: PCT/JP2007/065350
§ 371 (c)(1),
(2), (4) Date: Nov. 6, 2009

(87) PCT Pub. No.: WO2008/032508
PCT Pub. Date: Mar. 20, 2008

(65) Prior Publication Data
US 2010/0058824 A1    Mar. 11, 2010

(30) Foreign Application Priority Data
Sep. 11, 2006  (JP) .................................. 2006-245712

(51) Int. Cl.
*B21B 19/04* (2006.01)
(52) U.S. Cl.
USPC ........ 72/9.2; 72/11.3; 72/97; 72/209; 72/227; 72/365.2
(58) Field of Classification Search ............... 72/95–98, 72/208, 209, 226, 227, 250, 251, 365.2, 366.2, 72/8.1, 9.2, 11.1, 11.3, 11.8
See application file for complete search history.

(56) References Cited

U.S. PATENT DOCUMENTS

| | | | | |
|---|---|---|---|---|
| 7,739,892 | B2 * | 6/2010 | Yamakawa et al. | 72/97 |
| 8,091,394 | B2 * | 1/2012 | Osako et al. | 72/365.2 |
| 8,104,316 | B2 * | 1/2012 | Hirase et al. | 72/97 |

FOREIGN PATENT DOCUMENTS

| | | |
|---|---|---|
| JP | 59-7407 | 1/1984 |
| JP | 61-135409 | 6/1986 |
| JP | 8-71616 | 3/1996 |
| JP | 2001-121203 | 5/2001 |
| JP | 2001-141437 | 5/2001 |
| JP | 2005-134321 | 5/2005 |

OTHER PUBLICATIONS

Y. Funyu et al., "Hot On-line Wall Thickness Gage System for Seamless Tubes", *Tetsu-To-Hagane* No. 9, 1984, pp. 1139-1145.

* cited by examiner

*Primary Examiner* — David B Jones
(74) *Attorney, Agent, or Firm* — Clark & Brody

(57) ABSTRACT

The monitoring apparatus of production conditions in a piercing-rolling mill for piercing and rolling a billet B to produce a pipe S comprises an ultrasonic thickness meter which is installed on an exit side of the piercing-rolling mill and measures a thickness of the pipe S produced by the piercing-rolling mill, a thermometer which is installed on the exit side of the piercing-rolling mill and measures a surface temperature of the pipe S produced by the piercing-rolling mill, and a computing and displaying device which is connected to the ultrasonic thickness meter and the thermometer and displays a thickness distribution in a circumferential direction of the pipe S based on the thickness of the pipe S measured by the ultrasonic thickness meter, and a surface temperature distribution in a circumferential direction of the pipe S based on the surface temperature of the pipe S measured by the thermometer.

9 Claims, 4 Drawing Sheets

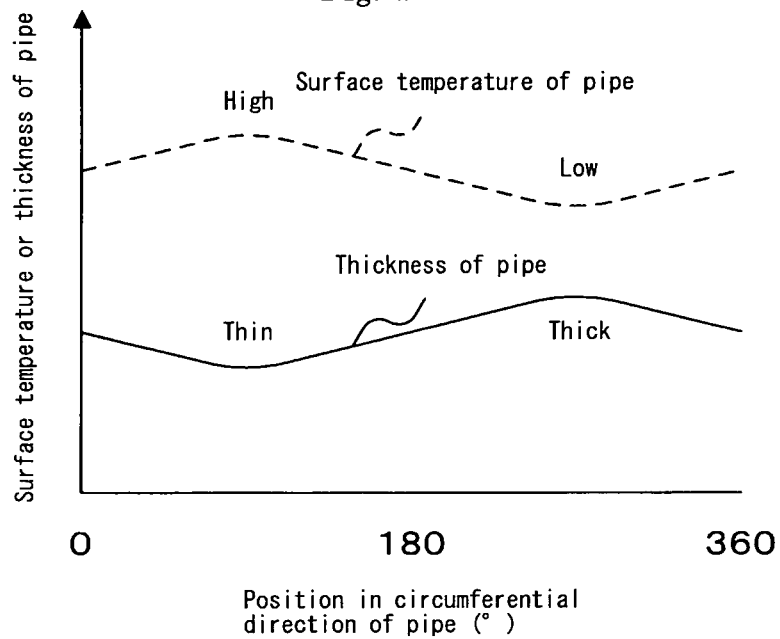

MONITORING APPARATUS AND MONITORING METHOD OF SEAMLESS PIPE OR TUBE PRODUCTION CONDITIONS AND MANUFACTURING FACILITIES OF SEAMLESS PIPE OR TUBE

TECHNICAL FIELD

The present invention relates to a monitoring apparatus and a monitoring method of seamless pipe or tube production conditions, and manufacturing facilities of a seamless pipe or tube to which the monitoring apparatus of seamless pipe or tube production conditions is applied. Particularly, the present invention relates to a monitoring apparatus and a monitoring method of seamless pipe or tube production conditions, which measure an eccentric uneven thickness of a pipe or tube produced by a piercing-rolling mill (piercer) on the exit side of the piercing-rolling mill and determine the cause of the occurrence of the eccentric uneven thickness and thereby enable a rapid correction to production conditions during the manufacturing of a seamless pipe or tube, and manufacturing of a seamless pipe or tube to which the monitoring apparatus of seamless pipe or tube production conditions is applied. Hereinafter, "pipe or tube" is referred to as "pipe" when deemed appropriate.

BACKGROUND ART

In the production of seamless pipes by a Mannesmann-mandrel mill method, first, billets of a raw material are heated in a rotary furnace type heating furnace and then supplied to a rolling line in succession. Specifically, the billet is pierced and rolled using the piercing plug and rolling rolls of a piercing-rolling mill to produce a hollow shell. Next, a mandrel bar is inserted into the hollow shell and the hollow shell is subjected to draw rolling with an outer surface of the hollow shell restricted with grooved rolling rolls of a mandrel mill comprising a plurality of stands, and thereby a thickness of the hollow shell is reduced to a predetermined thickness. Thereafter, the mandrel bar is drawn off and the material pipe with a reduced thickness is sized and rolled by a sizing-rolling mill to reduce an outer diameter to a predetermined outer diameter to obtain a product.

FIG. 1 (FIG. 1A and FIG. 1B) are views showing a schematic constitution of a piercing-rolling mill in which FIG. 1A is a side view thereof and FIG. 1B is a plan view thereof. In addition, the piercing plug is not shown in FIG. 1B.

As shown in FIG. 1, a piercing-rolling mill 10 includes a pair of rolling rolls 1a, 1b, which are inclined to each other, and a cannonball-like piercing plug 3 supported by a mandrel 2 at its rear end. While the pair of rolling rolls 1a, 1b are set in such a way that their axial directions are parallel to each other or cross each other at a predetermined crossed axes angle as viewed from the side, the pair of rolling rolls 1a, 1b are placed in such a way that their axial directions are inclined at inclination angles FA in the directions opposite to each other as viewed from above, and the pair of rolling rolls 1a, 1b are arranged so as to rotate in the same directions. The piercing plug 3 is placed between the pair of rolling rolls 1a, 1b.

In order to subject a solid billet B to piercing and rolling by using the piercing-rolling mill 10 having a constitution described above, first the billet B is fed to between a pair of rolling rolls 1a, 1b. After the billet B bites the pair of rolling rolls 1a, 1b, a force to rotate and a force to move forward in an axial direction are simultaneously exerted on the billet B by a frictional force of the rolling rolls 1a, 1b. Further, compressive stress and tensile stress is alternately exerted in succession on a central portion of the billet B by the rolling rolls 1a, 1b (This is called "rotary forging effects".) and the central portion of the billet B becomes a state in which a bore is easily opened before the billet B reaches a tip of the piercing plug 3. When the billet B impinges on the piercing plug 3, a bore is opened at the central portion of the billet B, and then the billet B is subjected to thickness processing in every half turn between the rolling rolls 1a, 1b and the piercing plug 3 to obtain a pipe (hollow shell) S.

In piercing and rolling using the piercing-rolling mill 10 described above, the largest problem relating to the dimensional accuracy of the pipes S produced is the occurrence of the eccentric uneven thickness (primary uneven thickness).

FIG. 2 is a sectional view of a pipe or tube for illustrating an eccentric uneven thickness of the pipe or tube.

As shown in FIG. 2, the eccentric uneven thickness is an uneven thickness (thickness variation) in a circumferential direction of the pipe S, which is produced due to eccentricity (deviation) between a center C1 of the outer surface and a center C2 of the inner surface of the pipe S, and an uneven thickness in which the thickness of the pipe S varies in a cycle of 360 degrees in a circumferential direction.

In order to correct the production conditions of the manufacturing facilities of a seamless pipe such as a piercing-rolling mill quickly so that the occurrence of the eccentric uneven thickness is quickly suppressed, it is effective to measure a thickness distribution in the circumferential direction of a pipe practically on a rolling line such as an exit side of the piercing-rolling mill and to reflect the result of this measurement in correcting the production conditions.

As a method of measuring a thickness distribution in the circumferential direction of a pipe on a rolling line, a method in which a γ ray thickness meter is used is publicly known. However, since the γ ray thickness meter is based on a principle that a thickness is determined based on attenuation of γ rays passing through the pipe, this method has a constraint that a thickness of the pipe cannot be measured in a state in which an instrument such as a piercing plug or a mandrel bar is inserted into the pipe in a location such as the exit side of the piercing-rolling mill or the entrance side of the mandrel mill.

Therefore, a method has been proposed, wherein the γ ray thickness meter is placed on the exit side of a mandrel mill or the entrance side or the exit side of a sizing-rolling mill on which an instrument is not inserted into the pipe to measure a thickness from two or more directions in a plane of a pipe cross section, and production conditions are set/corrected based on the results of this, see for example, Japanese Unexamined Patent Publication No. 8-71616).

However, in a measuring method using a γ-ray thickness meter, if there is a deviation between a core of the γ-ray thickness meter and a core of the pipe, the thickness distribution measured, especially the eccentric uneven thickness, has a large error. In addition, the core of the γ-ray thickness meter is an assumed core. For example, in the case of a γ-ray thickness meter of a multi-beam type disclosed in "TETSU-TO-HAGANE" (No. 9, p. 1139-1145 (1970)), the core of the γ-ray thickness meter means a barycenter position of the respective positions (a position where γ-rays applied from two or more directions intersect) at which the thickness of the pipe is measured. The above-mentioned deviation between cores is unavoidable on the rolling line. In practice, it is difficult to measure the eccentric uneven thickness with high precision before an off-line examination is performed after rolling. Therefore, a waiting period occurs before the results from the off-line examination are available and production conditions cannot be corrected quickly during the manufacturing of a seamless pipe.

Further, since the eccentric uneven thickness of a pipe can result from uneven heat or temperature variations in the circumferential direction of the billet and those resulting from whirling of the piercing plug, it is necessary to correct production conditions according to the respective causes in order to suppress the eccentric uneven thickness. That is, when the eccentric uneven thickness is one resulting from uneven heat in the circumferential direction of the billet, it is necessary to correct the conditions of a firing furnace so as to perform uniform heating. On the other hand, when the eccentric uneven thickness is one resulting from whirling of the piercing plug, it is necessary to take countermeasures such as correction of a core of the rolling rolls of the piercing-rolling mill, disposal of an abnormal piercing plug and the like. Therefore, in order to quickly correct production conditions during the manufacturing of a seamless pipe, it is desired not only to measure the eccentric uneven thickness of a pipe on a rolling line but also to provide a means capable of determining the cause of the occurrence of the eccentric uneven thickness.

DISCLOSURE OF THE INVENTION

The present invention has been made to eliminate the problem of the conventional technique. It is an object of the present invention to provide a monitoring apparatus and a monitoring method of seamless pipe or tube production conditions, which measure eccentric uneven thickness of a pipe or tube produced by a piercing-rolling mill on the exit side of the piercing-rolling mill and determine the cause of the occurrence of the eccentric uneven thickness and thereby enable to quickly correct production conditions during the manufacturing of a seamless pipe or tube, and manufacturing of a seamless pipe or tube to which the monitoring apparatus of seamless pipe or tube production conditions is applied.

In order to solve the above-mentioned problems, the present inventor made intense investigations, and consequently first found that if an ultrasonic thickness meter, which measures a thickness based on a difference between times at which an ultrasonic wave reflects on the inner surface and reflects on the outer surface of the pipe, is used in place of the γ ray thickness meter, a thickness can be measured with high precision even in a state in which a piercing plug is inserted into the pipe. The reason for this is likely that even in a state in which the piercing plug is inserted into the pipe, an air layer exists between the outer surface of the piercing plug and the inner surface of the pipe, and thereby an ultrasonic wave reflects on the inner surface of the pipe. Further, since the pipe rotates in a circumferential direction on the exit side of the piercing-rolling mill, by just locating the ultrasonic thickness meter in such a way that a thickness of one location in a circumferential direction of the pipe can be measured, a thickness distribution in a circumferential direction of the pipe can be measured. From findings described above, the present inventor discovered that if the ultrasonic thickness meter is used, the thickness distribution in a circumferential direction of a pipe and, therefore, an eccentric uneven thickness on the exit side of the piercing-rolling mill, which cannot be measured by a conventional γ ray thickness meter, can be measured.

Next, the present inventor investigated a method for determining the cause of the occurrence of the eccentric, uneven thickness. First, the present inventor found that when the uneven heat in a circumferential direction of the billet is generated, since deformation resistance is decreased at higher temperatures, a thickness of a corresponding part of a pipe subjected to piercing and rolling tends to get thin. On the contrary, the present inventor found that since deformation resistance is increased at lower temperatures compared with the higher temperatures, a thickness of a corresponding part of a pipe subjected to piercing and rolling tends to thicken. In other words, the present inventor found that when the eccentric uneven thickness is generated in a pipe resulting from the uneven heat of the billet, the strength of a negative correlation (a relationship in which a thickness of the pipe gets thin as a surface temperature of the pipe increases and a thickness of the pipe thicken as a surface temperature of the pipe decreases) between the uneven heat in a circumferential direction of the billet (therefore the surface temperature distribution in a circumferential direction of the pipe subjected to piercing and rolling corresponding to this uneven heat) and the thickness distribution of the pipe subjected to piercing and rolling increases. Furthermore, the present inventor found that it is possible to determine that the eccentric uneven thickness resulting from whirling of the piercing plug is generated when the correlation between the surface temperature distribution in a circumferential direction of a pipe and the thickness distribution of the pipe subjected to piercing and rolling is weak. From findings described above, the present inventor discovered that the cause of the occurrence of the eccentric uneven thickness can be determined by measuring the surface temperature distribution in a circumferential direction of a pipe on the exit side of the piercing-rolling mill and evaluating the correlation between this surface temperature distribution and the thickness distribution (or the eccentric uneven thickness) of the pipe.

The present invention was completed based on findings of the present inventor described above. That is, the present invention provides a monitoring apparatus of seamless pipe or tube production conditions, comprising: an ultrasonic thickness meter which is installed on the exit side of a piercing-rolling mill piercing and rolling a billet to produce a pipe or tube and measures a thickness of the pipe or tube produced by the piercing-rolling mill, a thermometer which is installed on the exit side of the piercing-rolling mill and measures a surface temperature of the pipe or tube produced by the piercing-rolling mill, and a computing and displaying device which displays a thickness distribution in a circumferential direction of the pipe or tube and a surface temperature distribution in a circumferential direction of the pipe or tube based on the thickness of the pipe or tube measured by the ultrasonic thickness meter and the surface temperature of the pipe or tube measured by the thermometer.

In accordance with the present invention, a thickness of the pipe or tube is measured with the ultrasonic thickness meter and a surface temperature of the pipe or tube is measured with the thermometer on the exit side of the piercing-rolling mill. Additionally, the thickness distribution and the surface temperature distribution in a circumferential direction of the pipe or tube are displayed (for example, monitor display or chart output) by the computing and displaying device. Thereby, an operator can recognize visually, for example, the displayed thickness distribution in a circumferential direction of the pipe or tube and if a variation of the thickness is larger than a predetermined reference value, the operator can determine that the eccentric uneven thickness is generated in the pipe or tube. Naturally, a constitution, in which the computing and displaying device compares a variation of the thickness or a maximum value/a minimum value of the thickness with a previously set predetermined reference value and automatically determines that the eccentric uneven thickness is generated in the pipe or tube if any one of these values exceeds the reference value, may be adopted. Further, in accordance with the present invention, since the thickness distribution and the surface temperature distribution in a circumferential direction of the pipe or tube are displayed, it is possible that for example, an operator recognizes visually the correlation between both distributions and determines the cause as eccentric uneven thickness resulting from the uneven heat of the billet if there is a tendency in which a negative correlation is strong and determines the cause as eccentric uneven thickness resulting from whirling of the piercing plug if a correlation is weak.

Preferably, the computing and displaying device determines the cause of the occurrence of the eccentric uneven thickness in the pipe or tube based on the correlation between the thickness distribution in a circumferential direction of the pipe or tube and the surface temperature distribution in a circumferential direction of the pipe or tube.

In accordance with such a preferable constitution, an operator's load can be reduced and results independent of individual differences among operators can be achieved, since the cause of the occurrence of the eccentric uneven thickness in the pipe or tube is automatically determined by the computing and displaying device. In addition, in order to determine the cause of the occurrence of the eccentric uneven thickness automatically, it is possible to adopt, for example, a constitution in which the computing and displaying device calculates a correlation coefficient (a value from −1 to +1) being a measure showing the strength of the correlation between the thickness distribution in a circumferential direction of the pipe or tube and the surface temperature distribution in a circumferential direction of the pipe or tube using a publicly known signal processing method, and in which the computing and displaying device determines the cause as eccentric uneven thickness resulting from the uneven heat of the billet when the correlation coefficient is less than a previously set predetermined negative value and determines the cause as eccentric uneven thickness resulting from whirling of the piercing plug when the correlation coefficient is the above-mentioned negative value or more.

Preferably, the computing and displaying device extracts components of the eccentric uneven thickness of the pipe or tube based on the thickness distribution in a circumferential direction of the pipe or tube and displays the extracted components of the eccentric uneven thickness of the pipe or tube and the surface temperature distribution in a circumferential direction of the pipe or tube.

In accordance with such a preferable constitution, since only components of the eccentric uneven thickness, which vary in a cycle of 360 degrees in a circumferential direction of the pipe or tube, is extracted from the thickness distribution and the extracted components of the eccentric uneven thickness are displayed instead of directly displaying the thickness distribution in a circumferential direction of the pipe or tube having a measured value possibly including noise or the like, it is possible to determine the occurrence of the eccentric uneven thickness and the cause thereof with higher precision. In addition, the components of the eccentric uneven thickness can be extracted by applying a publicly known frequency analysis method such as Fourier analysis to the thickness distribution in a circumferential direction of the pipe or tube.

Preferably, the computing and displaying device determines the cause of the occurrence of the eccentric uneven thickness in the pipe or tube based on the correlation between the extracted components of the eccentric uneven thickness of the pipe or tube and the surface temperature distribution in a circumferential direction of the pipe or tube.

In accordance with such a preferable constitution, determination accuracy is high since the components of the eccentric uneven thickness extracted are used, and further an operator's load can be reduced and results independent of individual differences among operators, can be achieved since the cause of the occurrence of the eccentric uneven thickness in the pipe or tube is automatically determined by the computing and displaying device.

In order to solve the above-mentioned problems, the present invention also provides a monitoring method of seamless pipe or tube production conditions, comprising the steps of: installing an ultrasonic thickness meter and a thermometer on the exit side of a piercing-rolling mill piercing and rolling a billet to produce a pipe or tube to measure a thickness distribution and a surface temperature distribution in a circumferential direction of the pipe or tube produced by the piercing-rolling mill, and determining the cause of the occurrence of the eccentric uneven thickness in the pipe or tube based on the correlation between the measured thickness distribution in a circumferential direction of the pipe or tube or the components of the eccentric uneven thickness of the pipe or tube extracted based on the thickness distribution and the measured surface temperature distribution in a circumferential direction of the pipe or tube.

In order to solve the above-mentioned problems, the present invention further provides a manufacturing apparatus for making of a seamless pipe or tube comprising: a piercing-rolling mill that pierces and rolls a billet to produce a pipe or tube, and any one of the above-mentioned monitoring apparatuses of production conditions.

In addition, as the ultrasonic thickness meter, a laser ultrasonic thickness meter, which can measure a thickness of the pipe or tube in a non-contact manner, can be suitably used.

In accordance with the present invention, it is possible to measure eccentric uneven thickness of a pipe or tube produced by the piercing-rolling mill on the exit side of the piercing-rolling mill and determine the cause of the occurrence of the eccentric uneven thickness. Therefore, it becomes possible to correct production conditions quickly even during operating the manufacturing facilities of a seamless pipe or tube to suppress the occurrence of the eccentric uneven thickness.

BRIEF DESCRIPTION OF THE DRAWINGS

FIG. 1 (FIG. 1A and FIG. 1B) are views showing a schematic constitution of a piercing-rolling mill in which

FIG. 4 is a schematic view showing an example of a thickness distribution and a surface temperature distribution in a circumferential direction of a pipe or tube displayed by the computing and displaying device as shown in FIG. 3.

BEST MODE FOR CARRYING OUT THE INVENTION

Hereinafter, an embodiment of the present invention will be described, appropriately referring to accompanying drawings.

Figure 3:
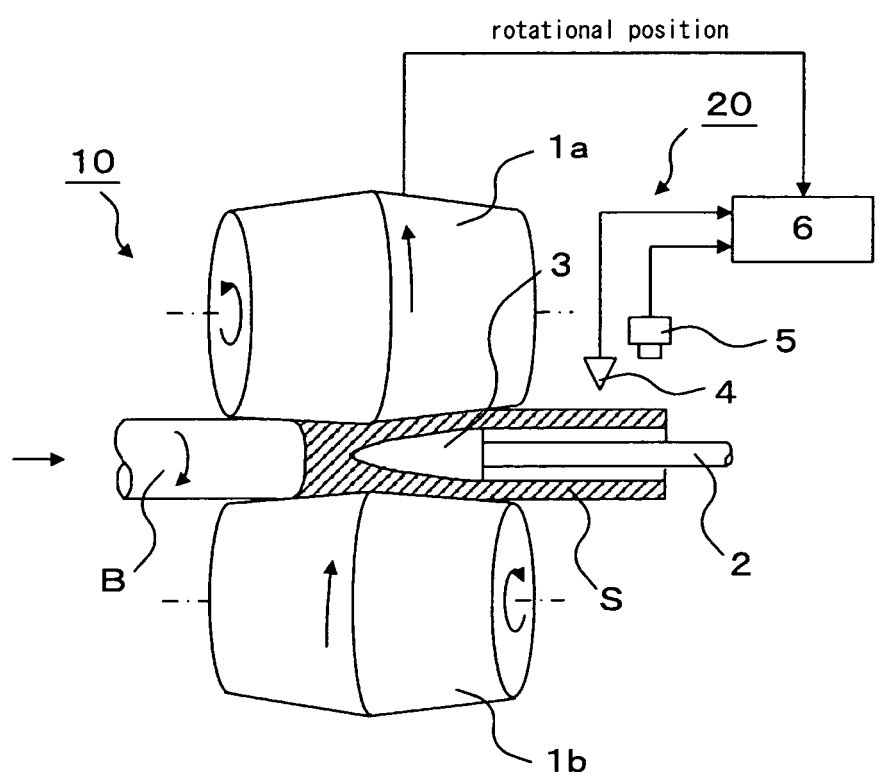
FIG. 3 is a side view showing a schematic constitution of a piercing-rolling mill to which the monitoring apparatus of production conditions according to an embodiment of the present invention is applied.

FIG. 3 is a side view showing a schematic constitution of a piercing-rolling mill to which the monitoring apparatus of production conditions according to an embodiment of the present invention is applied.

As shown in FIG. 3, the monitoring apparatus 20 of production conditions according to the present embodiment comprises an ultrasonic thickness meter 4 which is installed on the exit side of a piercing-rolling mill 10 piercing and rolling a billet B to produce a pipe S and measures a thickness of the pipe S produced by the piercing-rolling mill 10, a thermometer 5 which is installed on the exit side of the piercing-rolling mill 10 and measures a surface temperature of the pipe S produced by the piercing-rolling mill 10, and a computing and displaying device 6 which displays a thickness distribution in a circumferential direction of the pipe S and a surface temperature distribution in a circumferential direction of the pipe S based on the thickness of the pipe S measured by the ultrasonic thickness meter 4 and the surface temperature of the pipe S measured by the thermometer 5.

Figure 1A:
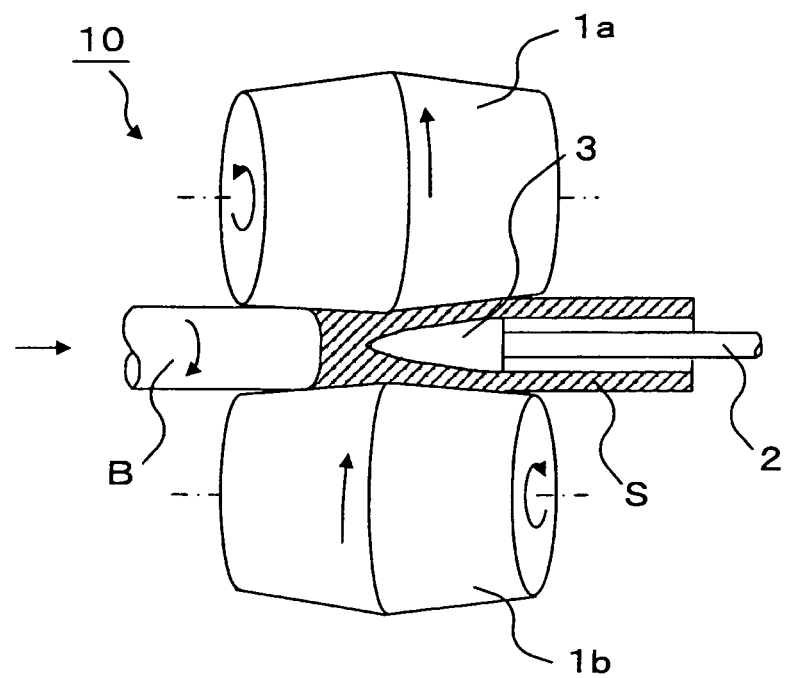
FIG. 1A is a side view thereof and FIG. 1B is a plan view thereof.
Figure 1B:
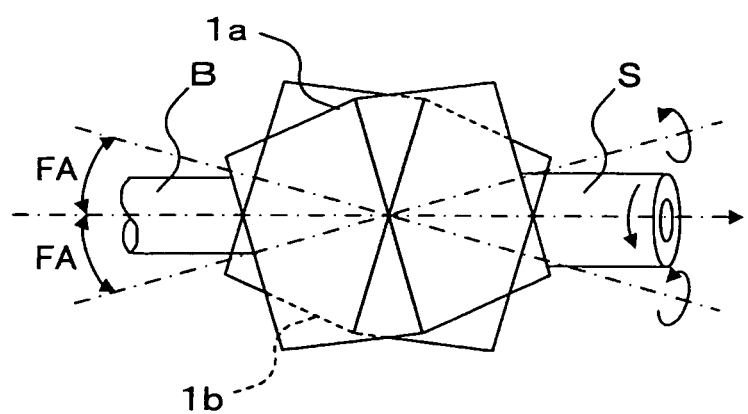
Figure 2:
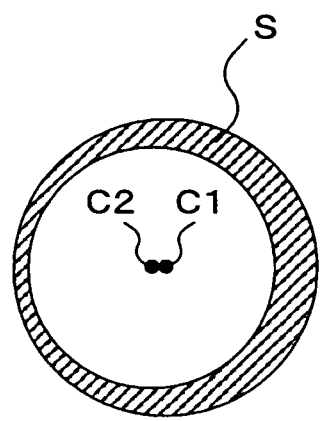
FIG. 2 is a sectional view of a pipe or tube for illustrating eccentric uneven thickness of the pipe or tube.

Since the piercing-rolling mill 10 has a similar constitution to the piercing-rolling mill described referring to FIG. 1, herein detail description thereof is omitted.

The ultrasonic thickness meter 4 of the present embodiment is a laser ultrasonic thickness meter. The laser ultrasonic thickness meter 4 comprises a pulsed laser for sending ultrasonic waves from the outer surface of the pipe S to inside of the pipe S, and a continuous-wave laser and an interferometer for receiving ultrasonic waves reflected on the inner surface of the pipe S. In this constitution, if pulsed laser light with high intensity is emitted from the pulsed laser, the pulsed laser light impinges on the outer surface of the pipe S to cause the pipe S to contract thermally, and therefore ultrasonic waves are generated. The generated ultrasonic waves are propagated in the pipe S and reflected at the inner surface of the pipe S to return back to the outer surface of the pipe S. Laser light emitted from the continuous-wave laser is always applied to the outer surface of the pipe S. The interferometer is arranged in such a way that light reflected on the outer surface of the pipe S enters the interferometer. When the ultrasonic waves return to the outer surface of the pipe S, its surface undergoes displacement and a phase of the reflected light entering the interferometer varies, and thereby, a state of interference also changes. By measuring the time which elapsed before detecting the changes in the state of interference after emitting the pulsed laser light from the pulsed laser, a thickness of the pipe S can be measured.

The ultrasonic thickness meter 4 is placed in such a way that a thickness of a predetermined location in a circumferential direction of the pipe S at rest can be measured when assuming that the pipe S remains at rest. Specifically, directions of the respective laser are set in such a way that both of light emitted from the pulsed laser and light emitted from the continuous-wave laser are applied to the outer surface of the above predetermined location of the pipe S. In practice, the thickness distribution in a circumferential direction of the pipe S is measured by the ultrasonic thickness meter 4 because the pipe S rotates in a circumferential direction.

The thermometer 5 of the present embodiment is a radiation thermometer to measure a surface temperature (outer surface temperature) of the pipe S by radiometry. The radiation thermometer 5 is also placed in such a way that a surface temperature of the predetermined location in a circumferential direction of the pipe S at rest can be measured when assuming that the pipe S remains at rest as with the ultrasonic thickness meter 4. Specifically, a light-receiving optical system of the radiation thermometer 5 is adjusted in such a way that a detection field of view for detecting thermal radiation light emitted from the pipe S corresponds to the above predetermined location of the pipe S. In practice, the surface temperature distribution in a circumferential direction of the pipe S is measured by the radiation thermometer 5 because the pipe S rotates in a circumferential direction.

In addition, as described later, in determining the cause of the occurrence of the eccentric uneven thickness in the pipe S, the correlation between the thickness distribution in a circumferential direction of the pipe S and the surface temperature distribution in a circumferential direction of the pipe S is evaluated. Accordingly, it is preferable to place the ultrasonic thickness meter 4 and the thermometer 5 so as to measure a thickness and a surface temperature of about the same location in a circumferential direction of the pipe S when assuming that the pipe S remains at rest. However, it is possible to place the ultrasonic thickness meter 4 and the thermometer 5 so as to measure a thickness and a surface temperature of different locations in a circumferential direction of the pipe S. In this case, measurement data is corrected based on positional relation of both meters and a rotational speed of the pipe S in such a way that positions in a circumferential direction of a thickness distribution and a surface temperature distribution in a circumferential direction of the pipe S are aligned with each other, and then the correlation between both distributions may be evaluated.

Further, as shown in FIG. 3, in the present embodiment, a constitution, in which the ultrasonic thickness meter 4 and the thermometer 5 are located in such a way that the ultrasonic thickness meter 4 is closer to the piercing-rolling mill 10 than the thermometer 5, is illustrated, but the present invention is not limited to this. The thermometer 5 may be located so as to be closer to the piercing-rolling mill 10 than the ultrasonic thickness meter 4.

Thicknesses of the pipe S measured by the ultrasonic thickness meter 4 and surface temperatures of the pipe S measured by the thermometer 5, described above, are inputted in the computing and displaying device 6. In addition, the computing and displaying unit 6 can be installed independently of a process computer for controlling the piercing-rolling mill 10, but a constitution in which the process computer also serves as the computing and displaying device 6 may be adopted.

The computing and displaying device 6 displays (monitor display or chart output) the thickness distribution in a circumferential direction of the pipe S and the surface temperature distribution in a circumferential direction of the pipe S based on thicknesses and surface temperatures at a plurality positions in a circumferential direction of the pipe S, which are sequentially or intermittently inputted associated with the rotation of the pipe S. In this time, the positions in a circumferential direction of the pipe S corresponding to the inputted thicknesses and the inputted surface temperatures, for example, can be calculated by the computing and displaying device 6 based on a rotational speed of the pipe S and times elapsed since starting to input measurement data (thickness, surface temperature). The rotational speed of the pipe S can be predicted by the computing and displaying device 6 based on various conditions of piercing and rolling set in the piercing-rolling mill 10. Since there is a certain correlation between a rotational speed of a rolling roll of the piercing-rolling mill and a rotational speed of the pipe S, it is also possible that as shown in FIG. 3, a rotational position (a rotational angle) of the rolling roll 1a is detected by a pulse generator or the like to be inputted in the computing and displaying device 6, and the computing and displaying device 6 determines a rotational position (that is, a position in a circumferential direction) of the pipe S based on the inputted rotational position of the rolling roll 1a and the above correlation FIG. 4 is a schematic view showing an example of the thickness distribution and the surface temperature distribution in a circumferential direction of the pipe S displayed by the computing and displaying device 6. In addition, FIG. 4 shows an example in which the thickness distribution and the surface temperature distribution of one turn (namely, positions of 0° to 360° in a circumferential direction of the pipe 5) of the pipe S are shown, but naturally, it is possible for the computing and displaying device 6 to display data of turns exceeding one turn such as two turns, three turns and more.

An operator can recognize visually the thickness distribution in a circumferential direction of the pipe S as shown in FIG. 4 and if a variation of the thickness is larger than a predetermined reference value, the operator can determine that the eccentric uneven thickness is generated in the pipe S. A constitution, in which the computing and displaying device 4 compares a variation of the thickness or a maximum value/a minimum value of the thickness with a previously set predetermined reference value and automatically determines that the eccentric uneven thickness is generated in the pipe S if any one of these values exceeds the reference value, may be adopted. Further, since the thickness distribution and the surface temperature distribution in a circumferential direction of the pipe S are displayed as shown in FIG. 4, it is possible that for example, an operator recognizes visually the correlation between both distributions and determines the cause as eccentric uneven thickness resulting from the uneven heat of the billet B if there is a tendency in which a negative correlation is strong and determines the cause as eccentric uneven thickness resulting from whirling of the piercing plug 3 if a correlation is weak. In addition, in an example shown in FIG. 4, a negative intense correlation that a thickness of the pipe S gets thin as a surface temperature of the pipe S increases and a thickness of the pipe S thickens as a surface temperature of the pipe S decreases is exhibited. Therefore, an operator who visually recognizes this can determine that this is the eccentric uneven thickness resulting from the uneven heat of the billet B.

In addition, without relying on an operator's visual recognition, a constitution, in which the computing and displaying device 6 automatically determines the cause of the occurrence of the eccentric uneven thickness in the pipe S, may be adopted. In order to determine the cause of the occurrence of the eccentric uneven thickness automatically, for example, a constitution in which the computing and displaying device 6 calculates a correlation coefficient (a value from −1 to +1) being a measure showing the strength of the correlation between the thickness distribution and the surface temperature distribution in a circumferential direction of the pipe S using a publicly known signal processing method, may be adopted. And the computing and displaying device 6 may determine the cause as eccentric uneven thickness resulting from the uneven heat of the billet B when the correlation coefficient is less than a previously set predetermined negative value and may determine the cause as eccentric uneven thickness resulting from whirling of the piercing plug 3 when the correlation coefficient is the above-mentioned negative value or more. In accordance with such a preferable constitution, an operator's load can be reduced and results independent of individual differences among operators can be achieved, since the cause of the occurrence of the eccentric uneven thickness in the pipe S is automatically determined by the computing and displaying device 6.

Further, as data which the computing and displaying device 6 displays, not the thickness distribution itself in a circumferential direction of the pipe S measured by the ultrasonic thickness meter 4 but the components of the eccentric uneven thickness of the pipe S extracted from the thickness distribution may be used. In order to do so, for example, a constitution, in which the computing and displaying device 6 applies a publicly known frequency analysis method such as Fourier analysis to the thickness distribution in a circumferential direction of the pipe S, is adopted. Then, only components of the eccentric uneven thickness, which vary in a cycle of 360 degrees in a circumferential direction of the pipe S, may be extracted from the thickness distribution which can have various frequency components. If a constitution, which displays components of the eccentric uneven thickness extracted from the thickness distribution of the pipe S as described above, is adopted, it is possible to determine the occurrence of the eccentric uneven thickness and the cause thereof with higher precision compared with the case of directly displaying the thickness distribution in a circumferential direction of the pipe S having measurement value possibly including noise or the like. In addition, a constitution, in which the computing and displaying device 6 compares a variation of the components of the eccentric uneven thickness extracted or a maximum value/a minimum value of the components of the eccentric uneven thickness with a previously set predetermined reference value and automatically determines that the eccentric uneven thickness is generated in the pipe S if any one of these values exceeds the reference value, may be adopted.

Further, when a constitution, in which the computing and displaying device 6 automatically determines the cause of the occurrence of the eccentric uneven thickness in the pipe S, is adopted, a constitution, in which the correlation between not the thickness distribution itself in a circumferential direction of the pipe S but the components of the eccentric uneven thickness of the pipe S extracted from the thickness distribution and the surface temperature distribution in a circumferential direction of the pipe S is evaluated, may be adopted. That is, a constitution, in which the computing and displaying device 6 calculates a correlation coefficient (a value from −1 to +1) being a measure showing the strength of the correlation between the components of the eccentric uneven thickness of the pipe S and the surface temperature distribution of the pipe S using a publicly known signal processing method, is adopted. Then, when the correlation coefficient is less than a predetermined negative value, the computing and displaying device 6 may determine the cause as eccentric uneven thickness resulting from the uneven heat of the billet, and when the correlation coefficient is the above-mentioned negative value or more, the computing and displaying device 6 may determine the cause as eccentric uneven thickness resulting from whirling of the piercing plug 3. If the constitution, in which the computing and displaying device 6 automatically determines the cause of the occurrence of the eccentric uneven thickness using the components of the eccentric uneven thickness extracted from the thickness distribution of the pipe S as described above, is adopted, the determination accuracy can be expected to be improved compared with the case where the thickness distribution itself of the pipe S is used.

In accordance with the monitoring apparatus 20 of production conditions of the present embodiment described above, it is possible to measure eccentric uneven thickness of a pipe S produced by the piercing-rolling mill 10 on the exit side of the piercing-rolling mill 10 and determine the cause of the occurrence of the eccentric uneven thickness. Therefore, it becomes possible to correct production conditions quickly even during operating the manufacturing facilities of a seamless pipe to suppress the occurrence of the eccentric uneven thickness in the pipe S.

The invention claimed is:

1. A monitoring apparatus of seamless pipe or tube production conditions in a piercing-rolling mill for piercing and rolling a billet to produce a pipe or tube, comprising:

an ultrasonic thickness meter which is installed on an exit side of the piercing-rolling mill and measures a thickness of the pipe or tube produced by the piercing-rolling mill, a thermometer which is installed on the exit side of the piercing-rolling mill and measures a surface temperature of the pipe or tube produced by the piercing-rolling mill, and a computing and displaying device which is connected to the ultrasonic thickness meter and the thermometer and displays a thickness distribution in a circumferential direction of the pipe or tube based on the thickness of the pipe or tube measured by the ultrasonic thickness meter, and a surface temperature distribution in a circumferential direction of the pipe or tube based on the surface temperature of the pipe or tube measured by the thermometer.

2. The monitoring apparatus of seamless pipe or tube production conditions according to claim 1, wherein the computing and displaying device determines a cause of an occurrence of an eccentric uneven thickness in the pipe or tube based on a correlation between the thickness distribution in a circumferential direction of the pipe or tube and the surface temperature distribution in a circumferential direction of the pipe or tube.

3. The monitoring apparatus of seamless pipe or tube production conditions according to claim 1, wherein the computing and displaying device extracts thickness components relating to an eccentric uneven thickness of the pipe or tube from the thickness distribution in a circumferential direction of the pipe or tube and displays the extracted thickness components relating to the eccentric uneven thickness of the pipe or tube and the surface temperature distribution in a circumferential direction of the pipe or tube.

4. The monitoring apparatus of seamless pipe or tube production conditions according to claim 3, wherein the computing and displaying device determines a cause of an occurrence of the eccentric uneven thickness in the pipe or tube based on a correlation between the extracted components of the eccentric uneven thickness of the pipe or tube and the surface temperature distribution in a circumferential direction of the pipe or tube.

5. The monitoring apparatus of seamless pipe or tube production conditions according to claim 1, wherein the ultrasonic thickness meter is a laser ultrasonic thickness meter.

6. Manufacturing facilities of a seamless pipe or tube comprising:

a piercing-rolling mill piercing and rolling a billet to produce a pipe or tube, and the monitoring apparatus of seamless pipe or tube production conditions in the piercing-rolling mill according to claim 1.

7. The manufacturing facilities of a seamless pipe or tube according to claim 6, wherein the ultrasonic thickness meter is a laser ultrasonic thickness meter.

8. A monitoring method of seamless pipe or tube production conditions in a piercing-rolling mill for piercing and rolling a billet to produce a pipe or tube, comprising the steps of:

installing an ultrasonic thickness meter and a thermometer on an exit side of the piercing-rolling mill to measure a thickness distribution and a surface temperature distribution in a circumferential direction of the pipe or tube produced by the piercing-rolling mill, and determining a cause of an occurrence of an eccentric uneven thickness in the pipe or tube based on a correlation between the measured thickness distribution in a circumferential direction of the pipe or tube or thickness components relating to the eccentric uneven thickness of the pipe or tube extracted from the measured thickness distribution and the measured surface temperature distribution in a circumferential direction of the pipe or tube.

9. The monitoring method of seamless pipe or tube production conditions according to claim 8, wherein a laser ultrasonic thickness meter is installed as the ultrasonic thickness meter.

* * * * *